Jan. 17, 1939.　　　L. L. DOLLINGER　　　2,144,451
AUTOMATIC AIR FILTER
Filed April 14, 1936　　　5 Sheets-Sheet 2

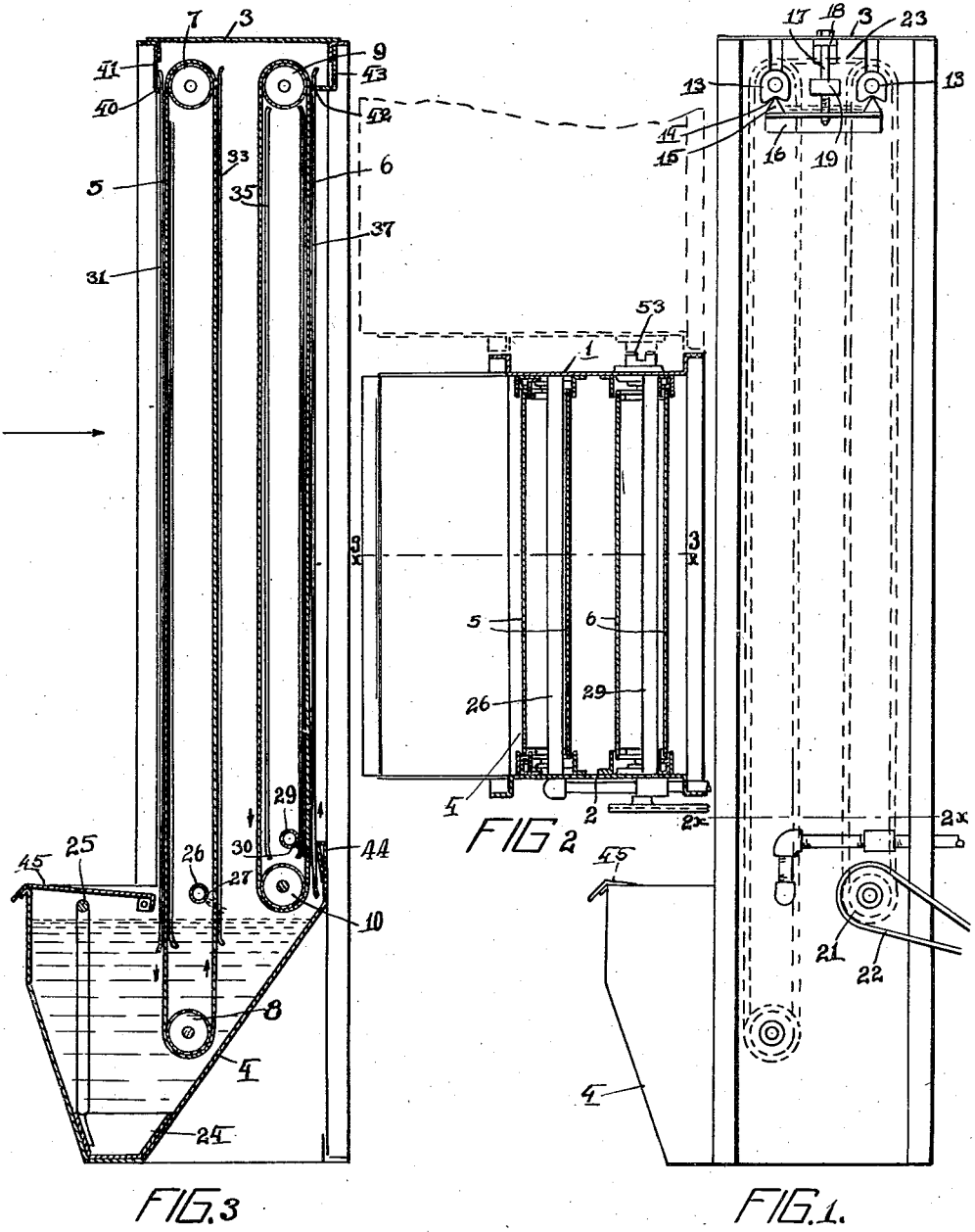

INVENTOR
LEWIS L. DOLLINGER
BY
ATTORNEY

Jan. 17, 1939.  L. L. DOLLINGER  2,144,451
AUTOMATIC AIR FILTER
Filed April 14, 1936   5 Sheets-Sheet 3
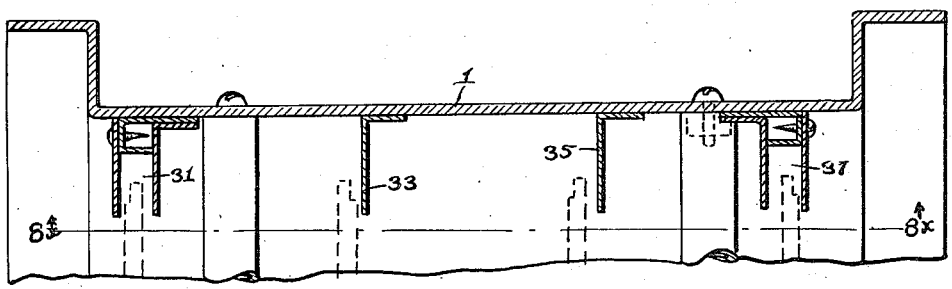
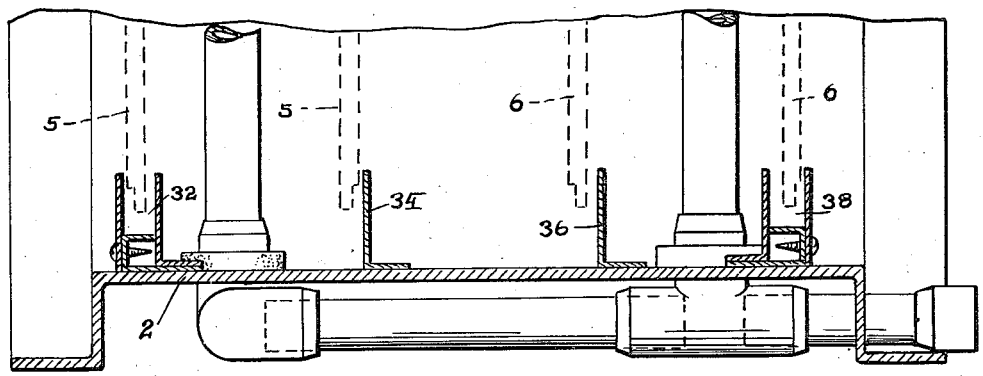
FIG. 6.
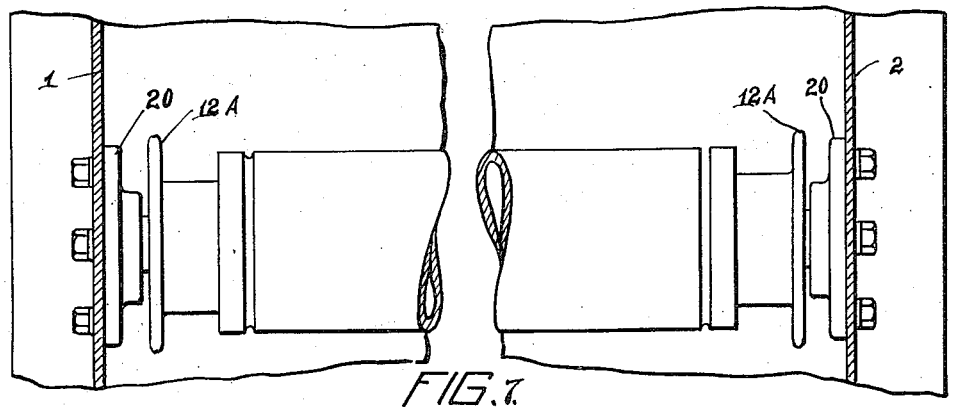
FIG. 7.
INVENTOR
LEWIS L. DOLLINGER
BY
ATTORNEY Jan. 17, 1939. L. L. DOLLINGER 2,144,451
AUTOMATIC AIR FILTER
Filed April 14, 1936 5 Sheets-Sheet 4
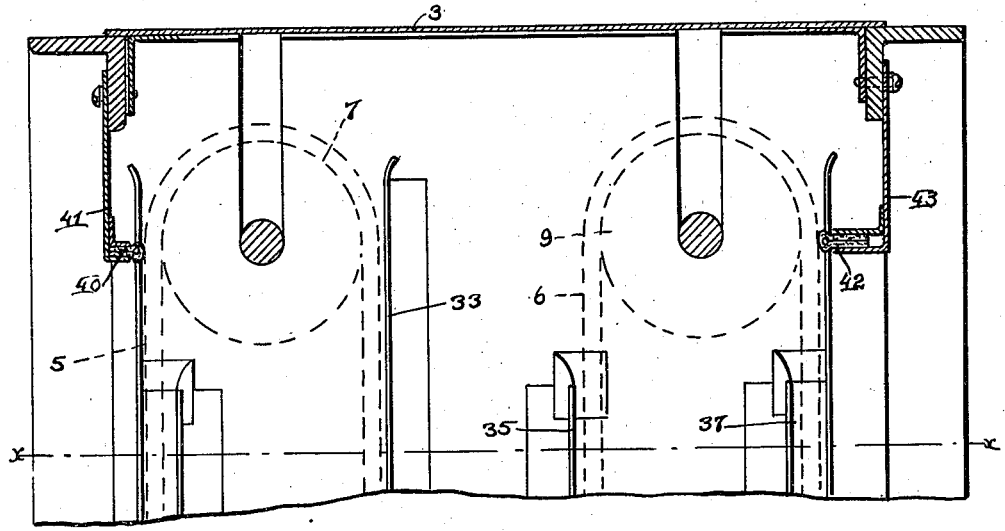
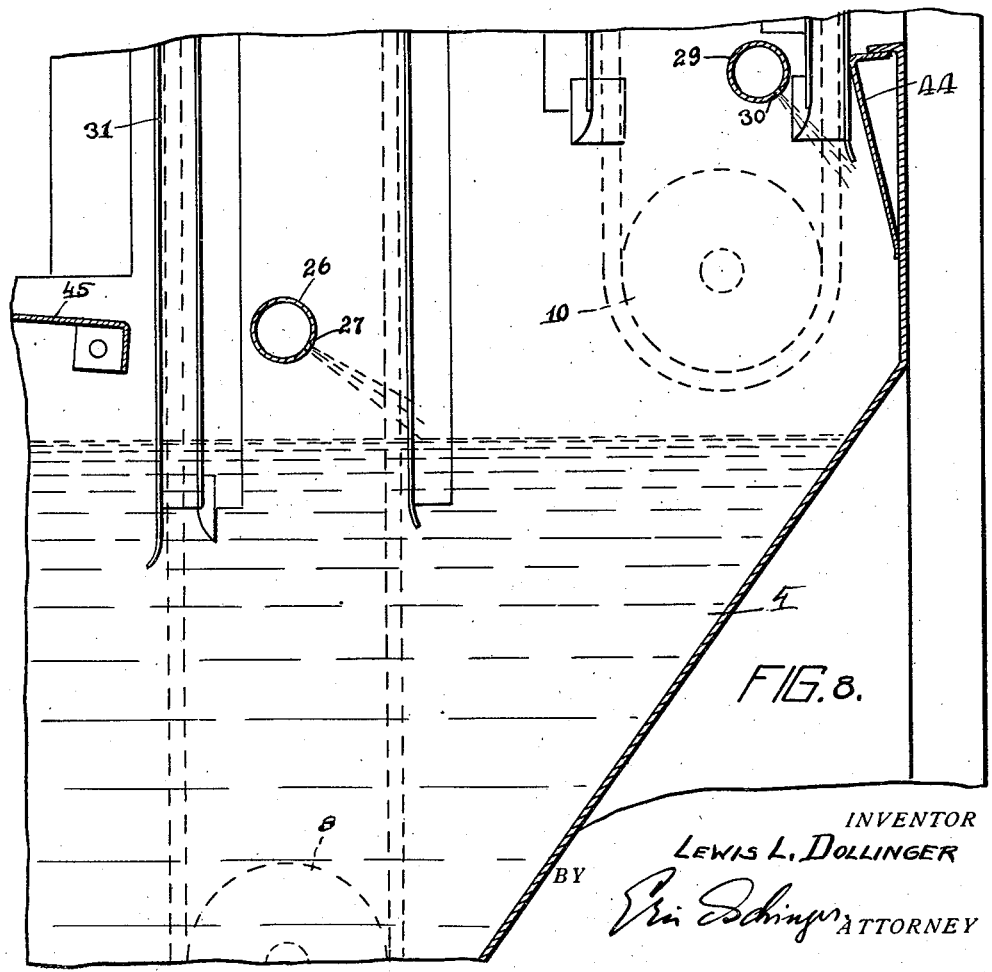
FIG. 8.
INVENTOR
LEWIS L. DOLLINGER
BY
ATTORNEY Jan. 17, 1939.   L. L. DOLLINGER   2,144,451
AUTOMATIC AIR FILTER
Filed April 14, 1936   5 Sheets-Sheet 5
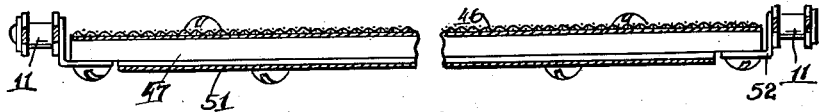
FIG. 10.
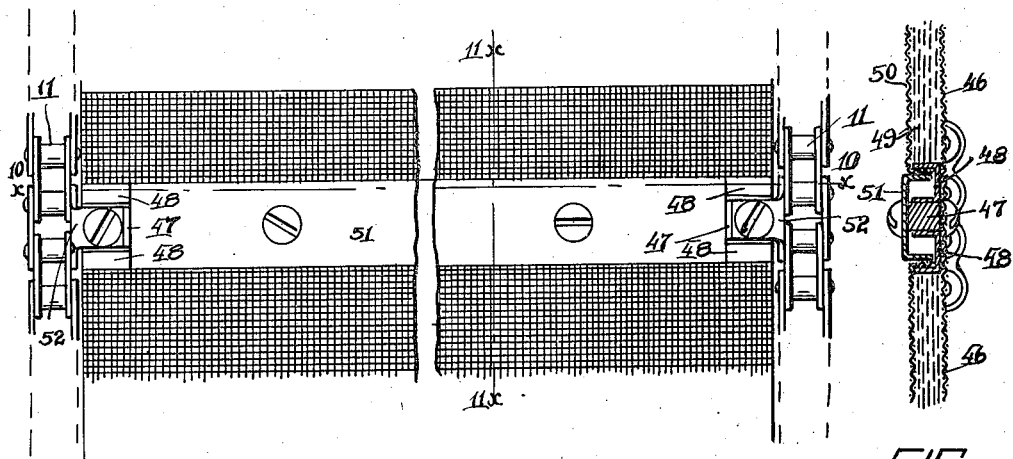
FIG. 11.
FIG. 9.
INVENTOR
LEWIS L. DOLLINGER
BY
ATTORNEY Patented Jan. 17, 1939

2,144,451

UNITED STATES PATENT OFFICE 2,144,451

AUTOMATIC AIR FILTER

Lewis L. Dollinger, Rochester, N. Y., assignor to Staynew Filter Corporation, Rochester, N. Y.

Application April 14, 1936, Serial No. 74,307

6 Claims. (Cl. 183—63)

This invention relates to automatic air filters and similar apparatus in which a viscous fluid is used in combination with a filtering medium, and one of the objects of this invention is to combine a viscous fluid type air filter with a dry type air filter in such a manner that their combined action results in a much higher filtering efficiency than can be obtained separately from either the one or the other of these types of air filters.

Another object of this invention is to provide a novel form of mounting for the filtering medium.

A further object of this invention is to provide a novel form of drive for the filtering apparatus.

A still further object of this invention is to provide a novel unit construction for the automatic filter so that a plurality of them can be combined and simultaneously operated where an increased filtering capacity is needed.

All these and other objects and attendant advantages will become more clearly apparent from the detailed description of the invention which follows, reference being had to the accompanying drawings in which Figure 1 is a side elevation of the automatic filter.

Figure 2 is a horizontal section of the automatic filter, the section being taken on the line 2x—2x of Figure 1.

Figure 3 is a vertical sectional view of the automatic filter, the section being taken on the line 3x—3x of Figure 2.

Figure 6 is an enlarged horizontal sectional view partly broken away and with the endless filter illustrated in dotted lines, the section being taken on the line 2x—2x of Figure 1.

Figure 7 is an enlarged elevational view of one of the lower supporting rollers and its support of one of the endless filters with the portions of the filter housing on which the support is mounted shown in section.

Figure 8 is an enlarged vertical sectional view of the automatic filter partly broken away with the endless filters indicated in dotted lines, the section being taken on the line 8x—8x of Figure 6.

Figure 9 is a detail front elevation of a portion of one of the endless filters.

Figure 10 is a horizontal sectional view of the endless filter, the section being taken on the line 10x—10x of Figure 9.

Figure 11 is a vertical sectional view of the endless filter, the section being taken on the line 11x—11x of Figure 9.

In the several figures of the drawings like reference numerals indicate like parts.

Figure 4:
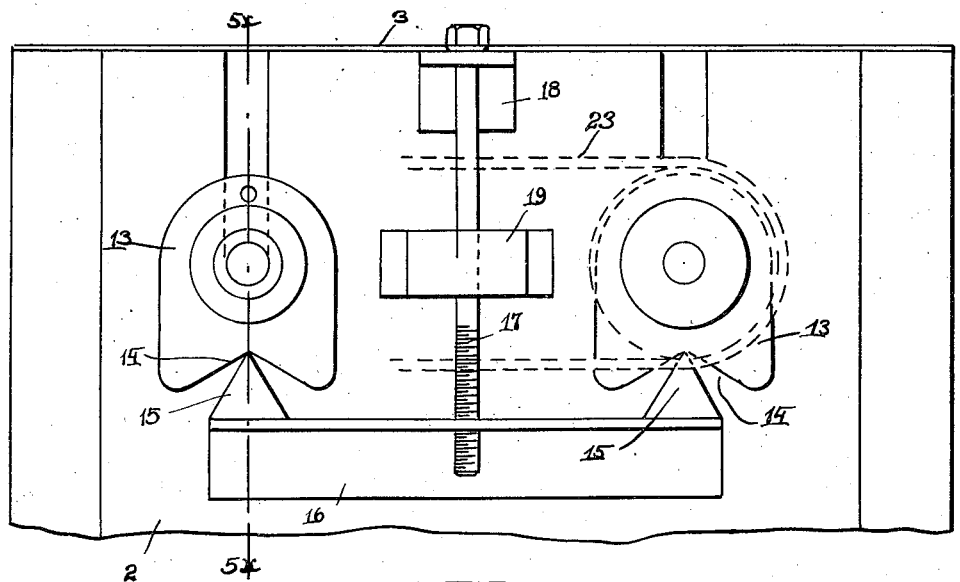
Figure 4 is an enlarged detail side elevation of a portion of the top of the automatic filter.

The endless filters incorporated in the automatic filter forming the subject matter of my present invention are mounted in a casing made up of the vertical sides 1 and 2, a cover 3 which connects the sides at the top and an oil reservoir 4 which connects the sides at the bottom. This provides an open front and back for the casing above the oil reservoir between which the filters are mounted so as to filter the air passing thru the casing. Two endless filters 5 and 6 are mounted in the casing one behind the other and each comprises a suitable screen or perforated belt on which is carried a filtering material as will hereinafter be described. Filter 5 is mounted to travel over rollers 7 and 8 and filter 6 is mounted to travel over the rollers 9 and 10 so that these rollers support their respective filters to have them filter the air passing thru the casing. The filters are given either a constant or an intermittent motion as they travel over their respective rollers and to make both rollers of each filter rotate in unison with its filter a chain 11 is located on each side of the filter supporting belt and meshes with the sprockets 12, 12 and 12A, 12A carried by the upper and lower filter supporting rollers respectively.

Figure 5:
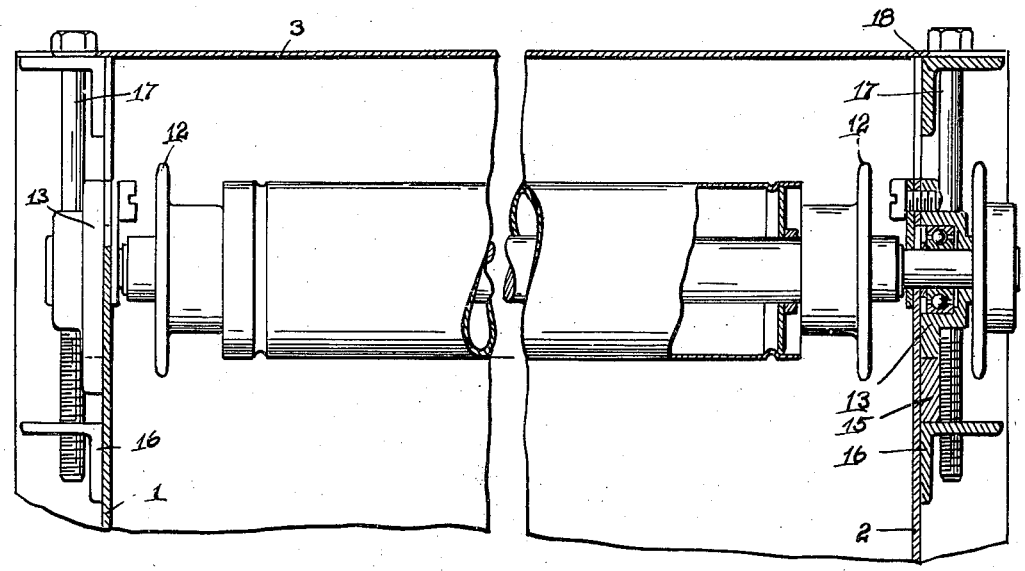
Figure 5 is a vertical sectional view of the top of the automatic filter, the section being taken on the line 5x—5x of Figure 4.

Both of the upper filter supporting rollers 7 and 9 are rotatably supported at substantially the same elevation between the sides 1 and 2 of the casing, but may be vertically adjusted for the purpose of loosening or tightening the filtering belts when such adjustment is required. For this reason each of the ends of the shafts of the upper supporting rollers is journaled in a bearing block 13 which is slidably mounted in a vertical slot provided in the side of the casing as illustrated in Figures 1, 4 and 5. These bearing blocks have an inverted V shaped recess 14 on the bottom thereof to have the wedge shaped supporting blocks 15 engage thereinto. Two of these wedge shaped supporting blocks are mounted on a cross beam 16 at each end thereof and into the middle of this beam is threaded a suspension bolt 17 with which the cross beam is adjustably suspended from a bracket 18, one of which projects from each side of the casing at the top thereof. A fixed guide strap 19 encircles the suspension bolt intermediate the ends to permit a limited movement of the bolt to one side or the other of its vertical position. The upper rollers of both of the filter belts may thus be tightened by the adjustment of one suspension bolt on each side of the casing because any variation in the length of the belts is compensated for by the free suspension of the cross beam 16 which allows this beam to assume an angular position when it is necessary to raise the bearing block of one supporting roller higher than the bearing block of the other supporting roller on the same side of the casing.

The lower supporting roller of the filters are mounted to rotate in fixed bearings 20 which are suitably supported on the inside of the casing as illustrated in Figure 7. The filters are operated by a motor (not shown) or other source of power which drives a sprocket 21 thru a chain drive 22. The sprocket 21 is carried by the shaft of the filter supporting roller 10 and in rotating this roller the motion thereof is transmitted to the upper filter roller 9 by the chains 11 on each side of the filter belt. The supporting rollers 7 and 9 are connected by a sprocket chain 23 shown in dotted lines in Figure 1 so as to transmit the motion to the rollers 7 and 8 and cause both filters 5 and 6 to rotate in unison. The filters are rotated so that the portion of the filter 5 at the front of the filter casing is downward and the direction of the portion of the filter 6 at the rear of the filter casing is upward as indicated by the arrows in Figure 3. In this way the portions of the filters 5 and 6 which face each other within the casing move in opposite directions with the filter 5 moving upward and the filter 6 moving downward.

As illustrated in Figure 3 the supporting roller 8 and portion of the lower end of the filter 5 is constantly submerged in an oil bath contained in the oil reservoir 4. In this way the filter is constantly covered with a fresh supply of a viscous fluid at the bottom of the casing which is carried thru the casing and back into the reservoir while the air to be filtered is forced thru the oil covered filtering medium carried by the filter. This causes foreign matter carried by the air to adhere to the filtering medium and the viscous fluid as it passes thru the filter so that by the time the oil is carried back into the reservoir the oil covered filtering medium is loaded with the foreign matter taken from the air in its passage therethru. The filter, in dipping back into the oil in the reservoir, causes the dirt laden oil to be washed off therefrom and makes room for a new supply of viscous fluid for filtering purposes. The foreign matter washed off from the filter is allowed to settle in the reservoir and collect in the removable sludge pan 24 located in the bottom of the reservoir. A handle 25 provided on the sludge pan permits the removal thereof from the reservoir for cleaning purposes.

To prevent an excess amount of viscous fluid or oil to be carried by the filtering medium, a blow off pipe 26 is mounted behind the upwardly moving section of the filter 5 at a point close to the level of the oil in the reservoir. This pipe is provided with a series of holes 27 which point downwardly against the filter section to cause a series of air streams to blow thru the filtering material and blow any excess oil carried thereby back into the reservoir. The filter is thus uniformly loaded with the viscous fluid to efficiently filter the air when it is forced therethru and carry the foreign matter taken from the air back into the reservoir to be deposited therein. In this way the air entering the front of the filter casing is consecutively filtered by two sections of the filter with the filtering medium carried by it uniformly impregnated with a viscous fluid.

After the air is thus filtered by the filter 5 it is consecutively passed thru two sections of the filter 6. The latter has its lower supporting roller 10 mounted above the level of the oil in the reservoir 4 so that the filtering medium carried by the filter is not brought in contact with the viscous fluid and remains dry. The air with any oil particles picked up by it in passing thru the sections of the filter 5, in addition to other foreign matter which may still be carried by the air after being filtered by the filter 5, is thus forced to pass thru the two dry sections of the filter 6 before it can leave the filter housing. In consecutively passing thru these dry sections of the filter 6 any oil particles together with other residual foreign matter carried by the air will embed themselves in the filtering medium so that when the air leaves the filter 6 and passes out thru the rear of the casing not the least trace of viscous fluid remains in the air in addition to having all of the foreign matter filtered out therefrom.

The foreign matter separated from the air in passing thru the filtering medium of the filter 6 is deposited in the oil reservoir by means of a blow off pipe 29 which is mounted between the two sections of the filter 6 near the lower ends thereof. This blow off pipe is provided with a series of downwardly pointing holes 30 thru which air is forced under pressure to blow thru the filtering medium in front of it and blow any foreign matter embedded therein down into the reservoir 4 to deposit the foreign matter therein and have it collect in the sludge pan 24 for the final removal from the reservoir.

To prevent air from passing around the edges of the filter, the edges of the front section of the filter 5 are made to project into the guide and sealing channels 31 and 32 with the filtering material held against the inside of these channels to prevent the air from entering unfiltered into the filter housing. The edges of the second section of the front filter 5 are held against the vertical guide flanges 33 and 34 in order to prevent air from passing around these edges instead of passing thru the filter section. The edges of the first filtering section of the filter 6 are held against similar vertical guide flanges 35 and 36 and the edges of the second section of the filter 6 project into a pair of guide and sealing channels 37 and 38 to provide a seal between the edges of the sections of the filter 6 and the wall of the filter casing.

The top of the open front or intake of the filter casing is sealed by a sealing strip 40 which is carried by a flange 41 and projects rearwardly therefrom in contact with the filter to keep any air from entering the top of the casing and passing unfiltered therethru. A similar seal is provided at the top of the casing at the open rear thereof. At this point a sealing strip 42 is carried by a flange 43 to contact the filter and prevent air from leaving the casing without passing thru the sections of the second filter.

The bottom of the casing at the intake is sealed by the viscous liquid contained in the reservoir 4 because the lower end of the filter 5 is submerged in this liquid. The bottom of the casing at the open rear thereof is sealed by a yielding sealing strip 44 which is mounted on the inside below the opening in the casing so as to contact the second of the filter sections of the filter 6 near the lower end thereof. In this way the top, bottom and sides of the filter sections which face the open front and back of the housing are sealed against the housing so that all air forced thru the housing must consecutively pass thru these sections to be filtered thereby.

The rear of the reservoir 4 is inclined toward the bottom below the filters 5 and 6 so that all foreign matter deposited in the oil by the filters is deflected toward the sludge pan 24 located in the bottom in front of the filter 5. The reservoir also extends forwardly of the filter 5 to permit the withdrawal of the sludge pan therefrom. A cover 45 normally covers the top of the portion of the reservoir which projects forwardly of the filter 5.

In Figures 9, 10 and 11 I have illustrated the make up of each filter. This consists of a metal backing screen 46 which extends the full length of each endless filter. To this backing screen are attached at suitable intervals cross bars 47 which carry on each side a sealing channel 48. The spaces in front of the backing screen 46 limited by the sealing channels 48 of consecutive cross members 47 are covered with a filtering medium 49 which may consist of any suitable material such as metal wool which will provide efficient air filtering means with or without a coating of viscous fluid. This filtering medium is suitably fastened to the backing screen with a screen cover 50 placed over it. The ends of the screen cover are bent to engage into the sealing channels 48 and a locking channel 51 is fastened to the cross members 47 to have its sides engage into the sealing channels to hold the ends of the screen covers in place therein. Angle brackets 52 are fastened to the ends of cross members and to these brackets are attached the sprocket chains 11 so as to provide a chain on each side of the filter for the uniform movement thereof. Breaking up the filtering medium into sections and connecting these sections, as above described, provides an efficient way of building up the filter and permits it to readily conform itself to the radius of the supporting roller.

As illustrated in section in Figures 2 and 6 the corners of the sides of the filter casing are offset for the purpose of connecting two or more of the filtering units at these offset corners and providing a sealed space between consecutive filter housings in which the driving connection between filtering units provided by a clutch 53 and the air connection for the air cleaners are made and concealed.

From the foregoing it will be apparent that the arrangement and rotation of the filters 5 and 6 are such that air, in passing thru these filters in each case, leave their clean side so as to prevent dirt laden oil from the filter 5 from being carried to the filter 6, and prevent foreign matter held suspended in the filter 6 from being carried off by the air in leaving filter 6.

Each filter has its second section moving upwardly away from the reservoir in which the dirt from the filters is collected and each of these sections passes by an air stream which blows off the excess oil of the filter 5 so that it will not be carried over to the filter 6 and blows off any foreign matter that may be carried by the filter 6 and deposits both oil and dirt in the reservoir 4. In this way the second section of each filter is kept clean to prevent the air currents from carrying foreign matter away from the filter.

I claim:

1. In an automatic filter the combination of a filter housing having an inlet and an outlet, a pair of endless filter belts mounted to rotate in said filter housing, a supporting roller at one end of each of said endless filter belts, movable bearing blocks supporting the ends of said supporting rollers, a pair of substantially wedge shaped rigidly connected supporting members engaging the bearing blocks at each end of the supporting rollers and a single suspension bolt adjustably engaging between said supporting members thereby holding each of said pair of supporting members suspended on said housing and causing uniform tension to be exerted on said filter belts by said suspension bolts.

2. A filter belt for automatic filters comprising a backing screen, cross members attached to the front of said screen and suitably spaced thereon, a sealing channel on each side of said cross members, a cover screen having its ends engage the sealing channels between the cross bars and a locking channel carried by said cross bar and engaging into said sealing channels to hold said cover screen locked thereinto.

3. A filter belt as set forth in claim 2 including filtering means interposed between said backing screen and said covering screens.

4. A filter belt as set forth in claim 2 including a feeding chain attached to the ends of said cross members for the feeding of said belt.

5. A filter belt for automatic filters comprising an endless backing screen, a plurality of cover screens, sealing and connecting joints carried by said backing screen to space said cover screens and filtering material interposed between said backing screen and said cover screens.

6. A filter belt as set forth in claim 5 with a feed chain attached to the ends of said sealing and connecting joints for the support of said belt.

LEWIS L. DOLLINGER.